United States Patent [19]

Akashi et al.

[11] 4,003,743
[45] Jan. 18, 1977

[54] PROCESS FOR PRODUCTION OF MOTION PICTURE FILM WITH SOUND TRACK CONTAINING P-TOLUENESULFONIC ACID AND GLACIAL ACETIC ACID

[75] Inventors: Goro Akashi; Masaaki Fujiyama; Akira Kasuga, all of Odawara, Japan

[73] Assignee: Fuji Photo Film Co., Ltd., Minami-ashigara, Japan

[22] Filed: May 19, 1975

[21] Appl. No.: 578,957

Related U.S. Application Data

[63] Continuation-in-part of Ser. No. 345,823, March 28, 1973, abandoned.

[30] Foreign Application Priority Data

Mar. 30, 1972 Japan .............................. 47-31943

[52] U.S. Cl. ..................................... 96/4; 96/39; 427/131
[51] Int. Cl.$^2$ ..................... G03C 7/24; G03C 5/14; G03G 19/00
[58] Field of Search ................... 96/39, 4, 84, 111; 427/129, 131, 338

[56] References Cited

UNITED STATES PATENTS 3,713,887  1/1973  Stimson .............................. 96/84 X

*Primary Examiner*—David Klein
*Assistant Examiner*—Louis Falasco
*Attorney, Agent, or Firm*—Sughrue, Rothwell, Mion, Zinn & Macpeak

[57] ABSTRACT

A magnetic sound track layer can be formed with good adherence on the emulsion layer of a photographic material for motion picture film by coating from a liquid composition comprising ferromagnetic powders, a binder, and at least 1% by weight, based on the weight of said ferromagnetic powders, of p-toluenesulfonic acid and at least 3% by weight, based on the weight of said powder of glacial acetic acid. A motion picture film where the magnetic sound track contains p-toluenesulfonic acid and glacial acetic acid.

13 Claims, No Drawings

PROCESS FOR PRODUCTION OF MOTION PICTURE FILM WITH SOUND TRACK CONTAINING P-TOLUENESULFONIC ACID AND GLACIAL ACETIC ACID

CROSS-REFERENCE TO RELATED APPLICATION

This application is a continuation-in-part application of Ser. No. 345,823, filed Mar. 28, 1973, of Goro Akashi et al., now abandoned titled "PROCESS FOR PRODUCTION OF MOTION PICTURE FILM WITH SOUND TRACK".

BACKGROUND OF THE INVENTION

1. FIELD OF THE INVENTION

This invention relates to a motion picture film with a sound track and to a process for producing the same.

2. DESCRIPTION OF THE PRIOR ART

A photographic material for motion picture film comprises a tape-like transparent plastic film and a coating of a silver halide photographic emulsion thereon. The motion picture film is produced by forming photographic images continuously on the photographic material at certain intervals so as to avoid the duplication of the individual images. Usually, a magnetic recording track and/or an optical recording track in the form of a narrow band is provided along the edge of one end in the widthwise direction, and sound recording is performed so that when the motion picture film is projected and reproduced the sound is synchronously reproduced with the reproduction of a series of continuous images (more precisely, the images are intermittent but appear continuous to the eye).

The magnetic sound recording track is provided on a motion picture film or the photographic emulsion layer of a photographic material for producing the motion picture film in view of the advantage of its handling in manufacturing or projecting apparatus. However, when the sound track is provided on the photographic emulsion layer of the photographic material, adhesion between the emulsion layer and the sound track is poor, and sometimes the sound track drops off from the film.

Attempts have therefore been made to remedy this defect, for example, by (1) exposing the plastic film of the motion picture film and coating a coating solution for forming a magnetic recording track directly on the exposed plastic film, by (2) providing a layer of an undercoat only on the part of the emulsion layer on which the sound track is to be formed, the undercoat serving to increase adhesion between the emulsion layer and the sound track, or (3) by changing the type of a binder in the sound track forming coating solution. However, methods (1) and (2) are troublesome and timeconsuming because of the necessity for partial exfoliation of the photographic layer or the provision of an undercoat layer, and method (3), relying on the selection of the binder, has not provided sufficient bonding effects.

Typical prior art motion picture films are disclosed in French Pat. No. 7046632 (corresponding to Japanese patent publication No. 23364/1974), French Pat. No. 7101772 (corresponding to Japanese patent publication No. 11565/1974), and French Pat. No. 7118200 (corresponding to U.S. Pat. No. 3,704,167).

SUMMARY OF THE INVENTION

It is therefore one object of this invention to provide a process for producing a motion picture film with a magnetic sound track which overcomes the difficulties of the prior art.

Another object is to provide a motion picture film where the magnetic sound track contains p-toluenesulfonic acid and glacial acetic acid.

According to this invention, there is provided a motion picture film and a process for producing a motion picture film with a magnetic sound track which comprises coating a predetermined part of the emulsion layer of a photographic material for motion picture film with a sound track-forming liquid composition comprising ferromagnetic powders, a binder, and at least 1% by weight, based on the weight of said ferromagnetic powders, of para-toluene-sulfonic acid, and at least 3% by weight, based on the weight of said ferromagnetic powders, of glacial acetic acid, and then drying the coating to form a magnetic sound track.

In one aspect of this invention, the liquid composition contains from 40 to 350 parts by weight, preferably 50 to 260 parts by weight, based on 300 parts by weight of ferromagnetic powder, of glacial acetic acid.

This invention relates to an improved process for producing a motion picture film having (1) a photosensitive emulsion layer comprising a photosensitive material for the motion picture and (2) a magnetic sound track where ferromagnetic powders are dispersed in a binder, and coated on the photosensitive emulsion layer, the improvement comprising using a coating liquid for forming the magnetic sound track containing ferromagnetic powders in a binder having incorporated therein at least 1% by weight of para-toluene sulfonic acid and at least 3% by weight of glacial acetic acid, based on the weight of the ferromagnetic powders, and then drying the coating to form a magnetic sound track.

Glacial acetic acid can be used in the coating liquid in an excess amount since the excess glacial acetic acid can be evaporated in a subsequent drying step. However, it is desirable to use a smaller amount of glacial acetic acid in view of adverse side effects such as gelation and deterioration in flowability of the coating liquid. Further, adhesion between a magnetic sound track and a photographic emulsion layer is not sufficient if only glacial acetic acid is employed.

On the other hand, if p-toluenesulfonic acid is used in too large amount, the concentration of ferromagnetic material decreases, relatively, because p-toluenesulfonic acid remains in the coating layer after drying. Accordingly, it is desirable to decrease the amount of p-toluenesulfonic acid used as low as possible.

The use of p-toluenesulfonic acid and glacial acetic acid in combination in the coating liquid for a sound track makes it possible to minimize residual amounts of these additives and also results in sufficient adhesion between the magnetic sound track and the photographic emulsion layer.

DETAILED DESCRIPTION OF THE INVENTION

The basic photographic material for motion pictures used in this invention is known, and is obtained by providing a photographic emulsion layer on a transparent plastic film such as polyethylene terephthalate, cellulose nitrate, cellulose diacetate, cellulose triacetate or polycarbonate film, with or without an undercoat layer.

Usually, the photographic emulsion is obtained by dispersing fine grains of silver halide in a hydrophilic polymeric material such as gelatin. It may further contain optional additives as are commonly used in the art such as a sensitizer, antifoggant, stabilizer, hardening agent or wetting agent (surfactant). For preparation of color motion picture films, the emulsion sometimes contains a coupler. Also, the individual ingredients may be separated into groups and each group made into a separate emulsion layer, these groups being superposed to form a multilayer photographic emulsion layer.

Some photographic emulsion layers have a protective layer thereon. The surface of the emulsion layer is composed of gelatin or a mixture of gelatin and another hydrophilic polymer such as polyvinyl pyrrolidone, polyvinyl alcohol or carboxymethyl cellulose. These photographic emulsion layers are all useful in the present invention.

The essence of this invention is to increase adhesion between a photographic emulsion layer having as its main component a hydrophilic component and a magnetic sound track having as its main component an oleophilic component formed on the emulsion layer, as such materials are generally known in the art. Hence, the present invention is applicable to all such systems irrespective of the composition of the photographic emulsion, the construction of the emulsion layer, or the type of the photographic emulsion (whether for black-and-white or color use or whether for positive or negative work).

Furthermore, the invention is applicable to conventional 35 mm, 16 mm and 8 mm motion picture films or the photographic materials therefor, and also to single or double systems.

The liquid composition for forming a magnetic sound track in accordance with this invention is prepared by dispersing ferromagnetic powders in a solution of a film-forming polymeric material in an organic solvent.

The film forming polymeric materials of the present invention generally have a molecular weight of from about 200 to about 5,000, preferably from 400 to 3,500, and examples thereof are polyamide resins, silicone resins, epoxy resins, polyurethane resins, acrylic resins, methacrylic resins, melamine resins, amino resins, phenol resins, urea resins, cellulose derivatives such as cellulose nitrate, acrylonitrile copolymers such as butadiene/acrylonitrile copolymers, vinylidene chloride/acrylonitrile copolymers, polyvinyl resins such as polyvinyl butyral, vinylacetate/vinyl chloride copolymers, synthetic rubbers and mixtures thereof.

In a manner similar to the limitations placed on the solvent(s) used, since the binder serves a physical supporting function in the final product, any binder of good physical properties which permits good dispersion of the other components can be used, so long as it is not harmfully affected by the p-toluenesulfonic acid or by the glacial acetic acid.

The organic solvent is one which dissolves the polymeric material but does not dissolve or swell the plastic film support used in the photographic material, and can, for example, be alcohols having 1 to 5 carbon atoms such as ethanol, butanol, isopropyl alcohol; ketones such as acetone, methylethyl ketone, methylisobutyl ketone; alkyl acetates where the alkyl group has 1 to 5 carbon atoms such as methyl acetate, ethyl acetate, propyl acetate, butyl acetate, amyl acetate; aromatic hydrocarbons such as benzene, toluene, xylene; chlorinated hydrocarbons such as methylene chloride, ethylene chloride, trichloroethane, tetrahydrofuran, tetrafluoroethylene; cyclic hydrocarbons such as cyclohexanone, cycloheptanone; and mixtures thereof. Since the solvent used merely performs a solvating function and is generally substantially completely driven off during drying, it will be appreciated by one skilled in the art that any solvents which do not exert a harmful influence on the components, preferably those removable without causing removal of p-toluenesulfonic acid, can be used in the present invention.

The ferromagnetic powders are generally from 0.05 to 1 micron, preferably from 0.1 to 0.7 micron, in particle size, though these values are not to be taken as limitative. Examples of the ferromagnetic powders used are $\gamma$-$Fe_2O_3$, $Fe_3O_4$, $CrO_2$, Fe-Ni alloy, Ni-Co alloy, or Fe-Co-Ni alloy. These ferromagnetic powders may contain different kinds of metal to improve their characteristics as is known to the art. The ferromagnetic powders in the following patents are illustrative of those used with success in the present invention: United States Patents: U.S. Pat. Nos. 3,046,158; 3,389,044; 3,625,849; 3,652,334; 3,034,988; 3,068,176; 3,100,194; 3,242,005; 3,498,837; Japanese Pat. Publication Nos.: 6309/69; 15507/69; 32005/72.

The liquid composition may, if desired, contain a dispersing agent, coating agent, lubricant, etc., as are known in the art in order to improve the ease of coating.

According to the present invention, at least 1% by weight, based on the weight of the ferromagnetic powders, of paratoluenesulfonic acid is added to the liquid coating composition. The amount of the para-toluenesulfonic acid may be reduced by adding the glacial acetic acid concurrently in an amount as heretofore defined.

The coating solution of the present invention for magnetic recording layers (ferromagnetic powder, binder, p-toluene sulfonic acid, glacial acetic acid and solvent) generally comprises (a) binder: 50 to 220 parts by weight; (b) p-toluenesulfonic acid: at least 3 parts by weight; (c) glacial acetic acid: at least 9 parts by weight; (d) solvent: 400 to 1500 parts by weight; based on 300 parts by weight of ferromagnetic powder. An important value is the minimum value of p-toluenesulfonic acid. The exact amount of binder and solvent is set by the coating system under consideration and can vary greatly. At above 60 parts of p-toluenesulfonic acid no better results are obtained as compared to the use of 60 parts. The components of the dried magnetic recording layer (ferromagnetic powder, binder, glacial acetic acid & p-toluenesulfonic acid) maintain the same ratios as described above, except solvent which is driven off. As the melting point of p-toluenesulfonic acid is 104° C and the boiling point of p-toluenesulfonic acid is 146° C, after the drying process most of the p-toluenesulfonic acid remains in the magnetic recording layer. If very high temperatures are used, though this is generally not advisable, and some p-toluenesulfonic acid is driven off, the minimum ratio thereof to ferro-magnetic powder should still be observed. Since the binder performs essentially a physical supporting function, the above range is not limitative on the binder, but does serve as a guideline to obtain an excellent product.

Especially superior results are provided with: 6 to 45 parts by weight, based on 300 parts by weight of ferromagnetic powder, of p-toluenesulfonic acid.

The liquid coating composition so prepared can be coated on the photographic emulsion layer of motion picture films on which photographic images are formed or not formed. Since both the motion picture film and the magnetic sound track are utilized in this case, the image areas of the motion picture film are not coated and the liquid composition is usually coated in the form of a narrow strip along the edge of one end thereof in the width-wise direction. Coating can be performed by any known coating method. After coating, the coated layer is dried to form a magnetic sound track.

The magnetic sound track so formed is firmly bonded to the photographic emulsion layer of the motion picture film, and therefore, the present invention is very useful in providing a motion picture film with a durable magnetic sound track.

Generally speaking, best results are obtained when the dried thickness of the photographic emulsion layer is from about 4 to about 40 microns, preferably 7 to 30 microns, and the dried thickness of the magnetic recording layer is from about 3 to about 20 microns, preferably from 8 to 15 microns. Little need will be encountered to stray outside those ranges since they meet most commercial requirements and provide an excellent product.

The essential concept of the present invention is the adhesion of an oleophilic magnetic sound recording track to a photographic emulsion layer which is hydrophilic. Thus, the invention can be applied not only to motion picture films to which the above description has been directed, but also to other articles, such as a hydrophilic coating composed mainly of gelatin, with equivalent effects. It should be understood that the invention is not limited to magnetic sound recording, but includes other magnetic signals within its concept, e.g., control signals, cueing signals, etc.

The following Examples illustrate the invention in greater detail.

COMPARATIVE EXAMPLE 1

300 g of ferromagnetic $\gamma$-$Fe_2O_3$ powders (average particle size $0.5\mu \times 0.1\ \mu \times 0.1\ \mu$), 120 g of cellulose nitrate, 30 g of nitrile rubber [the specific gravity of the nitrile rubber was 0.98 (Hycar 312; manufactured by Nippon Zeon Co., Ltd.)], 15 g of dibutyl phthalate, 3 g of castor oil and 600 g of butyl acetate were mixed in a ball mill for about 48 hours, and then para-toluenesulfonic acid was added to the mixture in the amount indicated in Table 1 and the system mixed for an additional 1 hour. The resulting liquid composition was filtered through a filter made of a sintered metal to form a coating composition (filtering process is conducted to remove any dirt, etc., in the coating solution, and a porous filter larger than the particle size of the ferromagnetic powder is used).

The coating composition was coated on the photographic emulsion layer of a photographic material for 16 mm motion picture film of a thickness of 7 to 30 microns along the edge of one end thereof in its widthwise direction to a dry thickness of 13 microns and a dry width of 2 mm, subjected to a magnetic field orientation (the magnetic field orientation was conducted for 0.7 seconds at 1,000 G (gauss)), and then dried.

The adhesion between the magnetic sound recording track and the photographic emulsion layer of the resulting motion picture film was examined, and the results are shown in Table 1. Adherence was determined as follows: a cellophane pressure-sensitive adhesive tape was adhered to the sound track layer and then suddenly removed. The adherence is expressed by the percentage of the remaining area of the track layer based on the area of the tape which adhered to the sound track layer. The adhesion of the adhesive tape and its removal were performed in the same manner for all samples.

Table 1

| Samples Nos. | Amount of para-toluenesulfonic acid (g) | Adherence (%) |
| --- | --- | --- |
| 1 (comparison) | 0 | about 20 |
| 2 | 3 | 70 |
| 3 | 5 | 90 |
| 4 | 10 | 97 |
| 5 | 20 | 100 |
| 6 | 30 | 100 |
| 7 | 50 | 100 |

The results shown in Table 1 demonstrate that the adherence between the sound track layer and the photographic emulsion layer increases with an increase in the amount of the para-toluenesulfonic acid added to the coating composition, and this effect was observed even with less than 1% by weight, based on the ferromagnetic powders, of para-toluenesulfonic acid (Sample No. 2).

EXAMPLE 1

300 g of ferromagnetic $\gamma$-$Fe_2O_3$ powders (average particle size $0.5\mu \times 0.1\ \mu \times 0.1\ \mu$), 120 g of cellulose nitrate, 30 g of nitrile rubber as in Example 1, 15 g of dibutyl phthalate, 3 g of castor oil and 600 g of butyl acetate were mixed in a ball mill for about 48 hours, and then para-toluenesulfonic acid and glacial acetic acid were added to the mixture in the amounts indicated in Table 2. By the same procedure as in Comparative Example 1, a liquid coating composition was prepared.

Using this liquid coating composition, a motion picture film with a magnetic sound recording track was produced in the same way as in Comparative Example 1. The adherence between the photographic emulsion layer and the sound track layer, determined by the same method as given in Comparative Example 1, is shown in Table 2.

TABLE 2

| A/B | 0 | 10 | 50 | 100 | 150 | 200 |
| --- | --- | --- | --- | --- | --- | --- |
| 0 | 20 | 20 | 20 | 40 | 50 | 60 |
| 3 | 70 | 70 | 70 | 80 | 80 | 85 |
| 5 | 90 | 90 | 90 | 95 | 95 | 98 |
| 10 | 97 | 97 | 97 | 97 | 99 | 100 |
| 20 | 100 | 100 | 100 | 100 | 100 | 100 |
| 30 | 100 | 100 | 100 | 100 | 100 | 100 |
| 50 | 100 | 100 | 100 | 100 | 100 | 100 |

In Table 2:
A is the weight of the p-toluenesulfonic acid (g);
B is the weight of the glacial acetic acid (g).

It is seen from the results shown in Table 2 that when glacial acetic acid is added in addition to para-toluenesulfonic acid, the adherence increases very abruptly as compared with the results of Comparative Example 1.

COMPARATIVE EXAMPLE 2

Using a liquid coating composition of the following formulation, a motion picture film with a sound track was produced in the same way as in Comparative Example 1.

Formulation of the liquid coating composition
Ferromagnetic $\gamma$-$Fe_2O_3$ powders
(average particle size $0.5\mu \times 0.11\mu \times$ -continued

| Formulation of the liquid coating composition | |
|---|---|
| 0.11μ) | 300 g |
| Vinyl chloride/vinyl acetate copolymer | 70 g |
| Carbon black | 20 g |
| Silicone oil | 2 g |
| Acrylate/acrylonitrile copolymer | 30 g |
| Butyl acetate | 600 g |
| Para-toluenesulfonic acid | as shown in Table 3 |

The vinyl chloride/vinyl acetate copolymer had a copolymerization ratio of 87% of vinyl chloride and 13% of vinyl acetate; commercially available as VYHH from the Union Carbide Corp. The acrylate/acrylonitrile copolymer had a viscosity of from 1, 500 to 2,500 c.p.s. at 20° C in a 40 wt % toluene solution; commercially available as Aror 623, from the Toagosei Chemical Industry Co., Ltd.

The adherence between the photographic emulsion layer and the sound track layer was examined as in Comparative Example 1. The results are shown in Table 3.

TABLE 3

| Samples Nos. | Amount of para-toluene-sulfonic acid (g) | Adherence (%) |
|---|---|---|
| 1 (comparison) | 0 | 60 |
| 2 | 10 | 98 |
| 3 | 20 | 100 |

The results shown in Table 3 demonstrate that even when the binder is changed, the effect of the para-toluenesulfonic acid is significantly appreciable as in the foregoing Comparative Examples.

COMPARATIVE EXAMPLE 3

A motion picture film with a magnetic sound track was produced in the same way as in Comparative Example 2 except that cellulose acetate butyrate was used instead of the vinyl chloride/vinyl acetate copolymer as a component of the binder.

The cellulose acetate butyrate was a copolymer composed of 46% combined cellulose 48% combined butyrate and 6% combined acetate.

The adherence between the photographic emulsion layer and the sound track layer was examined as in Comparative Example 1. The results are shown in Table 4.

TABLE 4

| Samples Nos. | Amount of para-toluene-sulfonic acid (g) | Adherence (%) |
|---|---|---|
| 1 (comparison) | 0 | 45 |
| 2 | 10 | 95 |
| 3 | 20 | 100 |

The same conclusion as in Comparative Example 2 was drawn.

COMPARATIVE EXAMPLE 4

A motion picture film with a magnetic sound track was produced in the same way as in Comparative Example 2 except that cellulose propionate was used instead of the vinyl chloride/vinyl acetate copolymer as a component of the binder.

The adherence between the photographic emulsion layer and the sound track layer was examined as in Comparative Example 1. The results are shown in Table 5.

TABLE 5

| Samples Nos. | Amount of Para-Toluene-Sulfonic Acid (g) | Adherence (%) |
|---|---|---|
| 1 (comparison) | 0 | 40 |
| 2 | 10 | 93 |
| 3 | 20 | 100 |

The same conclusion as in Comparative Example 2 was drawn.

EXAMPLE 2

The following compositions in Table 6 were mixed in a ball mill for about 48 hours, and then p-toluenesulfonic acid and glacial acetic acid were added to the mixture in the amount of Table 6 and the system mixed for an additional 1 hour.

The resulting liquid composition was filtered through a filter made of a sintered metal to form a coating composition (filtering process is conducted to remove any dirt, etc., in the coating solution, and a porous filter larger than the particle size of the ferromagnetic powder is used).

TABLE 6

| Compositions | Coating Solution | | | | | |
|---|---|---|---|---|---|---|
| | No. 1 | No.2 | No.3 | No.4 | No.5 | No.6 |
| Ferromagnetic powders ( —$Fe_2O_3$) (average particle size:0.5μ × 0.11μ × 0.11μ) | 300 | 300 | 300 | 300 | 300 | 300 |
| Vinylchloride-Vinylacetate Copolymer (87:13% copolymerization ratio) | 70 | 70 | — | — | — | — |
| Cellulose Acetate Butyrate Copolymer (48:6:48% copolymerization ratio) | — | — | 70 | 70 | — | — |
| Cellulose Propionate | — | — | — | — | 70 | 70 |
| Carbon Black | 20 | 20 | 20 | 20 | 20 | 20 |
| Dimethylpolysiloxane (molecular weight: about 1,000) | 2 | 2 | 2 | 2 | 2 | 2 |
| Acrylonitrile-Acrylate Copolymer (viscosity of from 1,500 to 2,500 C.P.S. at 20° C in a 40 wt.% toluene solution) | 30 | 30 | 30 | 30 | 30 | 30 |
| p-toluene Sulfonic Acid | 3 | 3 | 3 | 3 | 3 | 3 |
| Glacial Acetic Acid | — | 180 | — | 180 | — | 180 |
| Butyl Acetate | 600 | 600 | 600 | 600 | 600 | 600 |

Each coating solution Nos. 1–6 was coated on the photographic emulsion layer of a photographic material for 16 mm motion picture film at a thickness of 7 to 30 microns along the edge of one end thereof in its widthwise direction to a dried thickness of 13 microns and a dried width of 2 mm, subjected to a magnetic field orientation (the magnetic field orientation was conducted for 0.7 seconds at 1,000 Gauss), and then dried.

The adhesion between the magnetic sound recording track and the photographic emulsion layer of the resulting motion picture film was examined, and the results are shown in Table 7. Adherence was determined as follows: a cellophane pressure-sensitive adhesive tape was adhered to the sound track layer and then suddenly removed. The adherence is expressed by the percentage of the remaining area of the track layer based on the area of the tape which adhered to the sound track layer. The adhesion of the adhesive tape and its removal were performed in the same manner for all samples.

TABLE 7

| Samples Nos. | Amount of p-toluene-sulfonic acid (g) | Glacial Acetic Acid | Adherence (%) |
|---|---|---|---|
| 1 | 3 | — | 73 |
| 2 | 3 | 180 | 98 |
| 3 | 3 | — | 71 |
| 4 | 3 | 180 | 90 |
| 5 | 3 | — | 70 |
| 6 | 3 | 180 | 87 |

The results shown in Table 7 demonstrate that the adhesive properties in the case of using p-toluenesulfonic acid and glacial acetic acid in combination are superior to those obtained when only p-toluenesulfonic acid is used without using glacial acetic acid.

While the invention has been described in detail and with reference to specific embodiments thereof, it will be apparent to one skilled in the art that various changes and modifications can be made therein without departing from the spirit and scope thereof.

What is claimed is:

1. In a motion picture film comprising a support having coated thereon (1) a photographic emulsion layer having as its main component a hydrophilic component and containing at least one silver halide and (2) an oleophilic magnetic sound track coated on said emulsion layer, said sound track comprising a film-forming polymeric material and containing one or more ferromagnetic powders, the improvement wherein the sound track contains p-toluene sulfonic acid present in an amount of 3 to 60 parts by weight based on 300 parts by weight of said ferromagnetic powders, and wherein said sound track also contains glacial acetic acid present in an amount of at least 9 parts by weight based on 300 parts by weight of said ferromagnetic powders.

2. The motion picture film as claimed in claim 1, wherein said glacial acetic acid is present in an amount of from 40 to 350 parts by weight based on 300 parts by weight of said ferromagnetic powders.

3. A motion picture film as claimed in claim 1, wherein said film-forming polymeric material is present in an amount of from 50 to 220 parts by weight based on 300 parts by weight of said ferromagnetic powders.

4. The motion picture film of claim 1, wherein said film-forming polymeric material has a molecular weight from about 200 to about 5000.

5. The motion picture film of claim 1, wherein said ferromagnetic powders are from 0.05 to 1 micron in average particle size.

6. The motion picture film of claim 1, wherein said magnetic sound track is from about 3 to about 20 microns thick when dried.

7. A process for producing a motion picture film comprising a support having coated thereon at least one silver halide emulsion layer with a magnetic sound track which comprises coating a predetermined part of the silver halide emulsion layer with a sound track-forming liquid composition comprising ferromagnetic powders, a film-forming polymeric material, 3 to 60 parts by weight, based on 300 parts by weight of said ferromagnetic powders, of p-toluenesulfonic acid, and at least 9 parts by weight, based on 300 parts by weight of said ferro-magnetic powders, of glacial acetic acid, and then drying the coating to form a magnetic sound track.

8. The process of claim 7, wherein said glacial acetic acid is present in 40 to 350 parts by weight, based on 300 parts by weight of said ferromagnetic powders.

9. The process of claim 7, wherein said film-forming polymeric material is present in an amount of from 50 to 220 parts by weight, based on 300 parts by weight of said ferro-magnetic powder.

10. The process of claim 7, wherein said film-forming polymeric material has a molecular weight of from about 200 to about 5000.

11. The process of claim 7, wherein said ferromagnetic powders are from 0.05 to 1 micron in average particle size.

12. The process of claim 7, wherein said liquid composition comprises 400 to 1500 parts by weight, based on 300 parts by weight of said ferromagnetic powder, of one or more organic solvents.

13. The process of claim 7, wherein said magnetic sound track is from about 3 to about 20 microns thick when dried.

* * * * *